United States Patent [19]  
Abe

[11] Patent Number: 5,049,622  
[45] Date of Patent: Sep. 17, 1991

[54] FLUORINE-CONTAINING BLOCK COPOLYMER

[75] Inventor: Masatoshi Abe, Kitaibaraki, Japan

[73] Assignee: Nippon Mektron Limited, Tokyo, Japan

[21] Appl. No.: 584,341

[22] Filed: Sep. 18, 1990

[30] Foreign Application Priority Data

Oct. 6, 1989 [JP] Japan ................................. 1-261370

[51] Int. Cl.$^5$ .................... C08F 259/08; C08F 293/00
[52] U.S. Cl. .................................. 525/267; 525/276; 525/273
[58] Field of Search .............................. 525/267, 276

[56] References Cited

U.S. PATENT DOCUMENTS

| | | | |
|---|---|---|---|
| 4,158,678 | 6/1979 | Tatemoto et al. | 525/276 |
| 4,469,846 | 9/1984 | Khan et al. | 525/276 |
| 4,487,882 | 12/1984 | Ueta et al. | 525/276 |
| 4,861,836 | 8/1989 | Tatemoto et al. | 525/276 |

Primary Examiner—Carman J. Seccuro  
Attorney, Agent, or Firm—Fred Philpitt

[57] ABSTRACT $CF_2=CF_2$ and $CF_3OCF=CF_2$ are subjected to copolymerization reaction in the presence of an organic compound containing at least one of iodine and bromine, and then $CF_2=CF_2$ and $CH_2=CF_2$ are supplied to the reaction system to continue the polymerization reaction.

The thus obtained fluorine-containing block copolymer is of a low vinylidene fluoride content type and has a good solvent resistance.

6 Claims, No Drawings

FLUORINE-CONTAINING BLOCK COPOLYMER

BACKGROUND OF THE INVENTION

1. Field of the Invention

This invention relates to a process for producing a fluorine-containing block copolymer, and more particularly to a process for producing a fluorine-containing block copolymer having a good solvent resistance.

2. Description of the Prior Art

It is easy to obtain a copolymer of tetrafluoroethylene, vinylidene fluoride and perfluoro(methyl vinyl ether) of a high vinylidene fluoride content type, for example, in a molar ratio of 10/70/20 in a high yield by polymerization based on one charging of all the amounts of the individual monomers (see COMPARATIVE EXAMPLE 2, which follows). However, copolymers of low vinylidene fluoride content type having a good solvent resistance such as a high resistance to methanol, etc. have been in an increasing demand in the present market.

Even if a copolymer of low vinylidene fluoride content type, for example, in the above-mentioned molar ratio of 45/25/30, is tried to obtain by polymerization based on one charging of all the amounts of the individual monomers, there has been such a problem that vinylidene fluoride having a high polymerization reactivity preferentially undergoes the polymerization, while leaving the tetrafluoroethylene and the vinyl ether, which are hard to copolymerize, as residual gases, and the polymerization reaction is finally discontinued in yield of about 60%, resulting in a poor productivity (see COMPARATIVE EXAMPLE 1, which follows).

To overcome the problem, it is possible to increase the amount of a polymerization initiator or add the polymerization initiator in a divided manner from time to time during the polymerization, thereby increasing the yield, but when the polymerization initiator is used too much, the physical properties of vulcanized moldings, particularly compression set as a criterion for the sealing characteristics, will be deteriorated.

It is also possible to increase the yield by polymerization based on divided addition of the individual monomers, but in that case the polymerization initiator is used in an amount as small as that for the polymerization based on one charging of all the amounts of the individual monomers and an amount of the vinyl ether having a somewhat low reactivity is increased to decrease the vinylidene fluoride content, whereby the time for the divided addition will be prolonged and consequently the working time and polymerization time will be prolonged, resulting in an impractical productivity.

SUMMARY OF THE INVENTION

An object of the present invention is to provide a process for producing a copolymer of low vinylidene fluoride content type having a good solvent resistance, composed of tetrafluoroethylene, vinylidene fluoride and perfluoro(methyl vinyl ether).

Another object of the present invention is to provide a process for producing such a copolymer in high yield.

DETAILED DESCRIPTION OF THE PREFERRED EMBODIMENTS

These objects of the present invention can be attained by subjecting tetrafluoroethylene and perfluoro(methyl vinyl ether) to copolymerization reaction in the presence of an organic compound containing at least one of iodine and bromine, then supplying tetrafluoroethylene and vinylidene fluoride to the reaction system, and continuing the polymerization reaction, thereby producing a fluorine-containing block copolymer containing about 35 to about 60% by mole, preferably about 40 to about 55% by mole, of tetrafluoroethylene, about 10 to about 30% by mole, preferably about 15 to about 30% by mole, of vinylidene fluoride, and about 15 to about 50% by mole, preferably about 20 to about 40% by mole, of perfluoro(methyl vinyl ether).

In the first step of the present process, tetrafluoroethylene and perfluoro(methyl vinyl ether) are subjected to copolymerization in the presence of an organic compound containing at least one of iodine and bromine.

As a compound containing at least one of iodine and bromine, the following compounds can be used, for example:

RfI$_x$—[disclosed in Japanese Patent Application Kokai (Laid-open) No. 53-125, 491], wherein Rf: a fluorohydrocarbon group or a chlorofluorohydrocarbon group.

RI$_{1-2}$—[disclosed in Japanese Patent Application Kokai (Laid-open) No. 60-221, 409], wherein R: a hydrocarbon group having 1 to 3 carbon atoms.

RBr$_x$—[disclosed in Japanese Patent Application Kokai (Laid-open) No. 59-20, 310], wherein R: a saturated aliphatic hydrocarbon group.

Brominated olefin—[disclosed in Japanese Patent Publication No. 54-1585] including bromotrifluoroethylene, 4-bromo-3,3,4,4-tetrafluorobutene-1, etc.

ROCX=CYZ—[disclosed in Japanese Patent Application Kokai (Laid-open) No. 60-195, 113], wherein X, Y and Z: one or two of which are selected from bromine and iodine, the balance being hydrogen, fluorine or chlorine, and R: straight or cyclic alkyl, alkenyl or aryl.

Bromine or iodine-containing aromatic compounds or perfluoroaromatic compounds polysubstituted with bromine atoms or bromoalkyl groups or with iodine atoms or iodoalkyl groups—[disclosed in Japanese Patent Application Kokai (Laid-open) No. 62-232, 407].

Organic peroxides containing at least one of iodine and bromine—[disclosed in Japanese Patent Application Kokai (Laid-open) No. 63-23, 907].

.RBr$_n$I$_m$—[disclosed in Japanese Patent Application Kokai (Laid-open) No. 63-308, 008], wherein R: a fluorohydrocarbon group, a chlorofluorohydrocarbon group, a chlorohydrocarbon group, or a hydrocarbon group, and n and m: 1 or 2.

These organic compounds containing at least one of iodine and bromine generally bond to molecular terminals to produce efficiently cross-linked, fluorine-containing block copolymers. The bonding must be carried out so that about 0.001 to about 5% by weight, preferably about 0.01 to about 3% by weight, of at least one of iodine and bromine can be contained in the resulting fluorine-containing block copolymers.

In the copolymerization reaction of tetrafluoroethylene with perfluoro(methyl vinyl ether) in the first step, tetrafluoroethylene and perfluoro(methyl vinyl ether) are charged individually or in a gas mixture to make the former 40% by mole and the latter 60% by mole when, for example, a fluorine-containing block copolymer having the above-mentioned, preferable comonomer composition ratio is to be produced, and at least one of iodine and bromine is released from the corresponding compound containing at least one of iodine and bromine by radical cleavage due to the action of an organic peroxide radical generation source. The monomers of tetrafluoroethylene and perfluoro(methyl vinyl ether) undergo addition growth due to the high reactivity of the generated radicals, thereby forming random polymerization polymer chains.

In the second step successive to the first step, the polymerization reaction is continued by supplying tetrafluoroethylene and vinylidene fluoride to the reaction system.

In the copolymerization reaction of the second step, a gas mixture composed of 40% by mole of tetrafluoroethylene and 60% by mole of vinylidene fluoride is charged into the reaction system and subjected to the addition growth on the random polymerization polymer chains of the first step together with the residual gas mixture of tetrafluoroethylene and perfluoro(methyl vinyl ether) from the first step as a mixture of three kinds of the monomers, thereby producing fluorine-containing block copolymers containing at least one of iodine and bromine as bonded to the molecule terminals.

The copolymerization reaction between the individual monomers can be carried out by emulsion polymerization, suspension polymerization, solution polymerization, etc., preferably by emulsion polymerization. It is preferable to use a polymerization initiator as being formed into a redox system. The copolymerization reaction is carried out at a temperature of about 20° to about 80° C., preferably about 40° to 60° C., while protecting the terminals of the resulting copolymers.

In case of the suspension polymerization, the copolymerization reaction is carried out in a dispersion state of monomers in water, using a polymerization initiator such as organic peroxides, fluorine-containing organic peroxides, organic azo compounds, fluorine-containing organic azo compounds, etc. directly as it is, or as a solution in a solvent such as trifluorotrichloroethane, methylchloroform, dichlorotetrafluoroethane, difluorotetrachloroethane, etc.

In case of the solution polymerization, the copolymerization reaction is carried out in a polymerization solvent with a less chain transferrability such as perfluoro(1,2-dimethylcyclobutane), perfluoro(1,2-dichloroethane), perfluoro(1,2,2-trichloroethane), perfluorocyclohexane, perfluorotributylamine, $\alpha, \omega$-dihydroperfluoropolymethylene, perfluoro(methoxypolyethoxyethane), perfluorocyclobutane, t-butanol, etc., using a polymerization initiator such as organic peroxides, fluorine-containing organic peroxides, organic azo compounds, fluorine-containing organic azo compounds, etc.

In case of the emulsion polymerization, a water-soluble polymerization initiator such as inorganic peroxides, for example, persulfates, hydrogen peroxide, perchlorates, etc., organic peroxides, for example, t-butyl hydroperoxide, disuccinyl peroxide, etc. is used.

The inorganic peroxides are used also in a redox system together with a reducing agent such as sulfites, hyposulfites, ascorbates, etc. It is also possible to use an emulsifying agent such as fluorine-containing carboxylates, fluorine-containing sulfonates, etc. to attain stable dispersion of polymer particles in the liquid polymerization mixture or prevent an increase in the polymer concentration or deposition of polymers in a polymerization tank.

By adding about 1 to about 5% by weight, preferably about 1.5 to about 3% by weight on the basis of aqueous phase, of a fluorinated alcohol soluble in both of water and fluorine-containing monomers to the aqueous phase of the charged mixture in the copolymerization reaction, the added fluorinated alcohol can increase the solubility of the fluorine-containing monomers in the aqueous phase, thereby contributing to the transfer of the monomers from the liquid droplets suspended in the aqueous medium to the polymerization sites. The fluorinated alcohol for use to this end includes, for example, trifluoroethanol, hexafluoroisopropanol, $\omega$-hydro-2,2,3,3-tetrafluoropropanol, etc.

The above-mentioned various polymerization reactions are carried out generally at a temperature of about $-30°$ to about $150°$ C., but at a temperature of about $0°$ to about $50°$ C. in case of the redox system. The polymerization pressure is not perticularly limited, and a broad pressure range can be used in accordance with desired polymerization rate and degree of polymerization and is generally within about 1 to 100 kg/cm$^2$.

The fluorine-containing block copolymers obtained according to the present process can be cured according to so far well known, various vulcanization methods, for example, peroxide vulcanization method using an organic peroxide, a polyamine vulcanization method using a polyamine compound, a polyol vulcanization process using a polyhydroxy compound, an irradiation method using actinic rays, electron beams, etc. Among these vulcanization methods, the peroxide vulcanization method is particularly preferably, because the cured elastomer has a high mechanical strength and the structure of cross-linking points forms stable carbon-carbon bonds, thereby providing a vulcanization product with good resistances to chemicals and solvents.

The organic peroxide for use in the peroxide vulcanization method includes, for example, 2,5-dimethyl-2,5-di(t-butylperoxy)hexane, 2,5-dimethyl-2,5-di(t-butylperoxy)hexine-3, benzoyl peroxide, bis(2,4-dichlorobenzoyl)peroxide, dicumyl peroxide, di-t-butyl peroxide, t-butylcumyl peroxide, t-butyl peroxybenzene, 1,1-bis(t-butylperoxy)-3,5,5-trimethylcyclohexane, 2,5-dimethylhexane-2,5-dihydroxyperoxide, $\alpha,\alpha'$-bis(t-butylperoxy)-p-diisopropylbenzene, 2,5-dimethyl-2,5-di(benzoylperoxy)hexane, t-butylperoxyisopropyl carbonate, etc.

In the peroxide vulcanization method using these organic peroxides, a polyfunctional unsaturated compound, such as tri(metha)allyl isocyanurate, tri(metha)allyl cyanurate, tri(metha)allyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. is usually used as a cocross-linking agent to obtain better vulcanization characteristics, mechanical strength and compression set.

Hydroxides, oxides, carbonates, etc. of metals, such as hydroxides of calcium, magnesium, barium, sodium, lithium, potassium, zinc, iron(III), etc.; oxides of calcium, magnesium, copper, zinc, lead, sodium, potassium, barium, etc.; and carbonates of calcium, magnesium, zinc, sodium, potassium, lithium, etc.; or basic lead phosphite, etc. are used as a cross-linking aid, depending upon the desired purpose.

The foregoing individual components are added to the peroxide vulcanization system generally in the following proportions: about 0.1 to about 10 parts by weight, preferably about 0.5 to about 5 parts by weight, of an organic peroxide, about 0.1 to about 15 parts by weight, preferably about 0.5 to about 10 parts by weight, of a cross-linking agent, and not more than about 15 parts by weight of a cross-linking aid are used per 100 parts by weight of the fluorine-containing block copolymer.

The foregoing individual components for the vulcanization system can be added to and kneaded with the fluorine-containing block copolymer directly as they are, or can be diluted with carbon black, silica, clay, talc, diatomaceous earth, barium sulfate, etc., or can be used as a master batch dispersion in combination with the fluorine-containing elastic copolymer. Basides the foregoing individual components, the vulcanization system can further contain so far well known fillers, reinforcing agents, plasticizers, lubricants, processing aids, pigments, etc. in appropriate combinations.

Vulcanization can be carried out by mixing the foregoing respective components by the ordinary mixing method such as roll mixing, kneader mixing, Bambary mixing, solution mixing, etc., followed by heating. Heating is carried out at about 100° to about 250° C. for about 1 to about 120 minutes for the primary vulcanization and at about 150° to about 300° C. for zero to about 30 hours for the secondary vulcanization.

According to the present process, a block copolymer of a low vinylidene fluoride content type, having a good solvent resistance, composed of tetrafluoroethylene, vinylidene fluoride and perfluoro(methyl vinyl ether) can be produced in high yield.

PREFERRED EMBODIMENTS OF THE INVENTION

The present invention will be described below, referring to Examples and Comparative Examples.

EXAMPLE 1

1,000 g of deoxygenated, demineralized water, 4.2 g of ammonium perfluorooctanate as a surfactant, 3 g of disodium hydrogen phosphate dodecahydrate as a buffer agent, 12 g of an aqueous 5% sodium hydroxide solution, 1.63 g of 1-iodo-2-bromoperfluoroethane, 0.8 g of ammonium persulfate as a polymerization initiator and 10 g of hexafluoroisopropanol as a dispersing agent were charged into an autoclave having a capacity of 3 liters provided with a stirrer, and then the entire autoclave was cooled to $-30°$ C.

Then, the inside space of the autoclave was thoroughly flushed with nitrogen, and after the elimination of the nitrogen therefrom, 295 g of perfluoro(methyl vinyl ether) and 118 g of tetrafluoroethylene were successively introduced into the autoclave under pressure. Then, the temperature of the reaction system was elevated to 50° C. and the autoclave was stirred to start polymerization reaction.

Pressure of 16.5 kg/cm$^2$ at the intiation of the reaction was lowered to 10.5 kg/cm$^2$ after 26 hours, and at this time point 117 g of a gas mixture composed of vinylidene fluoride and tetrafluoroethylene in a molar ratio of the former to the latter of 60:40 was introduced into the autoclave under pressure. By the introduction of the gas mixture under pressure, the autoclave pressure was recovered to 25.0 kg/cm$^2$. Then, the reaction was continued for further 19 hours and the pressure was lowered again to 2.5 kg/cm$^2$. After it was confirmed that the pressure was not lowered any more, the unreacted gas mixture was purged from the autoclave to discontinue the polymerization reaction.

An aqueous 5% sodium chloride solution was added to the resulting aqueous emulsion to coagulate the product. The coagulated product was washed with water and dried, whereby 479 g of rubbery copolymer having the following characteristics was obtained (yield: 90.2%).

Composition by $^{19}$F-NMR analysis (% by mole):
 Tetrafluoroethylene—43
 Vinylidene fluoride—22
 Perfluoro(methyl vinyl ether)—35
Mooney viscosity ML$_{1+10}$ (121° C.): 101 pts

EXAMPLE 2

In Example 1, the polymerization reaction was initiated without using hexafluoroisopropanol as the dispersing agent, and when the pressure of 16.1 kg/cm$^2$ at the initiation of reaction was lowered to 9.3 kg/cm$^2$ after 23 hours, the gas mixture was introduced into the autoclave under pressure, and the pressure was recovered to 24.1 kg/cm$^2$ by the introduction of the gas mixture under pressure. Then, the reaction was continued for further 18.5 hours until the pressure was lowered again to 2.4 kg/cm$^2$.

By the similar successive treatments, 465 g of rubbery product having the following characteristics was obtained (yield: 87.5%).

Composition by $^{19}$F-NMR analysis (% by mole):
 Tetrafluoroethylene—44
 Vinylidene fluoride—23
 Perfluoro(methyl vinyl ether)—33
Mooney viscosity ML$_{1+10}$ (121°): 91 pts

EXAMPLE 3

In Example 1, the polymerization reaction was initiated without using hexafluoroisopropanol as the dispersing agent, and when the pressure of 17.2 kg/cm$^2$ at the initiation of reaction was lowered to 12.3 kg/cm$^2$ after 7.5 hours, the gas mixture was introduced into the autoclave under pressure, and the pressure was recovered to 24.4 kg/cm$^2$ by the introduction of the gas mixture under pressure. Then, the reaction was continued for further 17 hours until the pressure was lowered again to 4.0 kg/cm$^2$.

By the similar successive treatments, 444 g of rubbery product having the following characteristics was obtained (yield: 83.5%).

Composition by $^{19}$F-NMR analysis (% by mole):
 Tetrafluoroethylene—44
 Vinylidene fluoride—23
 Perfluoro(methyl vinyl ether)—33
Mooney viscosity ML$_{1+10}$ (121° C.): 74 pts

EXAMPLE 4

In Example 1, the polymerization reaction was initiated by changing the amount of 1-iodo-2-bromoperfluoroethane to 2.45 g without using hexafluoroisopropanol as the dispersing agent, and when the pressure of 17.0 kg/cm$^2$ at the initiation of reaction was lowered to 14.5 kg/cm$^2$ after 6 hours, the gas mixture was introduced into the autoclave under pressure, and the pressure was recovered to 25.4 kg/cm$^2$ by the introduction of the gas mixture under pressure. Then, the reaction was continued for further 15.5 hours until the pressure was lowered again to 5.8 kg/cm$^2$.

By the similar successive treatments, 426 g of rubbery product having the following characteristics was obtained (yield: 80.0%).

Composition by $^{19}$F-NMR analysis (% by mole):

Tetrafluoroethylene—41
Vinylidene fluoride—22
Perfluoro(methyl vinyl ether)—37
Mooney viscosity $ML_{1+10}$ (121° C.): 25 pts

COMPARATIVE EXAMPLE 1

In Example 1, the polymerization reaction was initiated by successively introducing 295 g of perfluoro(methyl vinyl ether), 178 g of tetrafluoroethylene and 57 g of vinylidene fluoride into the autoclave under pressure, then elevating the temperature of the reaction system to 50° C. and stirring the autoclave without using hexafluoroisopropanol as the dispersing agent.

The pressure of 26.8 g/cm² at the initiation of reaction was lowered to 8.5 kg/cm² after 20 hours, and after it was confirmed that the pressure was not lowered any more, the unreacted gas was purged from the reaction system to discontinue the polymerization reaction.

By the same successive treatments as in Example 1, 345 g of rubbery copolymer having the following characteristics was obtained (yield: 65.0%).
Composition by $^{19}$ F-NMR analysis (% by mole):
Tetrafluoroethylene—44.5
Vinylidene fluoride—29
Perfluoro(methyl vinyl ether)—26.5
Mooney viscosity $ML_{1+10}$ (121° C.): 79 pts

COMPARATIVE EXAMPLE 2

In Example 1, the polymerization reaction was initiated by successively introducing 166 g of perfluoro(methyl vinyl ether), 50 g of tetrafluoroethylene and 224 g of vinylidene fluoride into the autoclave under pressure, while changing the amount of 1-iodo-2-bromoperfluoroethane to 2.0 g without using hexafluoroisopropanol as the dispersing agent, and then by elevating the temperature of the reaction system to 50° C. and stirring the autoclave.

The pressure of 26.8 kg/cm² at the initiation of reaction was lowered to 8.5 kg/cm² after 20 hours, and after it was confirmed that the pressure was not lowered any more, the unreacted gas was purged from the reaction system to discontinue the polymerization reaction.

By the same successive treatments as in Example 1, 437 g of rubbery copolymer having the following characteristics was obtained (yield: 98.0%).
Composition by $^{19}$ F-NMR analysis (% by mole):
Tetrafluoroethylene—11
Vinylidene fluoride—70
Perfluoro(methyl vinyl ether)—19
Mooney viscosity $ML_{1+10}$ (121° C.): 62 pts Two parts by weight of MT carbon black, 2 parts by weight of 2,5-dimethyl-di(2,5-t-butylperoxy)hexane (concentration 40% by weight; the balance being diatomaceous earth added), 7 parts by weight of triallyl isocyanurate (concentration 40% by weight; the balance being diatomaceous earth added; 10 parts by weight for Comparative Example 2), and 3 parts by weight of lead oxide (6 parts by weight for Comparative Example 2) were added to 100 parts by weight of each of the fluorine-containing copolymers obtained in the foregoing Examples 1 to 4 and Comparative Examples 1 to 2. The resulting mixtures were each subjected to roll mixing to prepare fluorine-containing fluorine-containing elastomer compositions.

The thus obtained compositions were vulcanized and molded into sheets and P-24 O-rings through primary vulcanization at 180° C. for 10 minutes and secondary vulcanization at 200° C. for 22 hours, and the thus obtained sheets were subjected to measurement of normal state physical properties and volume change ratio when dipped in acetone at 25° C. for 70 hours according to JIS K-6301 procedure, and the thus obtained O-rings were subjected to measurement of compression set at 25% compression at 200° C. for 70 hours. The results are shown in the following Table.

TABLE

| Measurement item | Example | | | | Comp. Ex. | |
|---|---|---|---|---|---|---|
| | 1 | 2 | 3 | 4 | 1 | 2 |
| Hardness (JIS-A) | 71 | 67 | 72 | 72 | 73 | 75 |
| 100% modulus (kg/cm²) | 37 | 30 | 48 | 54 | 42 | 54 |
| Tensile strength (kg/cm²) | 180 | 165 | 207 | 182 | 200 | 195 |
| Elongation (%) | 267 | 270 | 254 | 210 | 252 | 268 |
| Volume change ratio by Acetone dipping (%) | 50 | 50 | 48 | 44 | 68 | 236 |
| Compression set (%) | 39 | 42 | 36 | 22 | 29 | 27 |

What is claimed is:

1. A process for producing a fluorine-containing block copolymer, which comprises subjecting tetrafluoroethylene and perfluoro(methyl vinyl ether) to copolymerization reaction in the presence of an organic compound containing at least one of iodine and bromine and then successively supplying tetrafluoro-ethylene and vinylidene fluoride to the reaction system, thereby continuing the polymerization reaction.

2. A process according to claim 1, wherein the fluorine-containing block copolymer contains 35 to 60% by mole of tetrafluoroethylene and 15 to 50% by mole of perfluoro(methyl vinyl ether), the balance being vinylidene fluoride.

3. A process according to claim 1, wherein the fluorine-containing block copolymer contains 40 to 55% by mole of tetrafluoroethylene and 20 to 40% by mole of perfluoro(methyl vinyl ether), the balance being vinylidene fluoride.

4. A process according to claim 1, wherein 0.001 to 5% by weight of the organic compound containing at least one of iodine and bromine is bonded to the terminals of the copolymer molecule.

5. A process according to claim 1, wherein 0.01 to 3% by weight of the organic compound containing at least one of iodine and bromine is bonded to the terminals of the copolymer molecule.

6. A process according to claim 1, wherein the copolymerization is carried out by emulsion polymerization, suspension polymerization or solution polymerization.

* * * * *